(12) United States Patent
Shetty et al.

(10) Patent No.: US 11,829,326 B2
(45) Date of Patent: Nov. 28, 2023

(54) SYSTEM AND METHOD TO CONDUCT STAGGERED MAINTENANCE ACTIVITY BASED ON CUSTOMER PRIORITIZATION IN A CLOUD BASED SAAS PLATFORM CONTACT CENTER

(71) Applicant: inContact INC., Sandy, UT (US)

(72) Inventors: Sanketh Shetty, Pune (IN); Swati Kadu, Pune (IN); Yuvraj Sawant, Pune (IN)

(73) Assignee: inContact INC., Sandy, UT (US)

( * ) Notice: Subject to any disclaimer, the term of this patent is extended or adjusted under 35 U.S.C. 154(b) by 297 days.

(21) Appl. No.: 17/380,046

(22) Filed: Jul. 20, 2021

(65) Prior Publication Data

US 2023/0023025 A1 Jan. 26, 2023

(51) Int. Cl.
  *G06F 9/44* (2018.01)
  *G06F 16/11* (2019.01)
  *G06F 16/21* (2019.01)
(52) U.S. Cl.
  CPC .......... *G06F 16/119* (2019.01); *G06F 16/214* (2019.01)
(58) Field of Classification Search
  None
  See application file for complete search history.

(56) References Cited

U.S. PATENT DOCUMENTS

| | | | |
|---|---|---|---|
| 10,389,697 B1* | 8/2019 | Kulkarni | H04W 12/08 |
| 10,740,286 B1* | 8/2020 | Gilderman | G06F 9/5038 |
| 2013/0085989 A1* | 4/2013 | Nayyar | G06F 16/119 |
| | | | 707/610 |
| 2015/0304446 A1* | 10/2015 | Kato | H04L 41/08 |
| | | | 709/223 |
| 2020/0285608 A1* | 9/2020 | Chakankar | G06F 16/119 |
| 2022/0050670 A1* | 2/2022 | Liljeback | G06F 8/65 |

* cited by examiner

*Primary Examiner* — Qamrun Nahar
(74) *Attorney, Agent, or Firm* — SOROKER AGMON NORDMAN RIBA; Liat Lin; Sharone Godesh

(57) ABSTRACT

A computerized-method to conduct a staggered maintenance activity based on tenants' prioritization for tenants of a cloud-based Software as a Service (SaaS) platform contact-center, is provided herein. The computerized-method includes operating a Staggered-Maintenance-Activity (SMA) module. The SMA module includes: (i) selecting a plurality of tenants from the data store of one or more tenants, for a migration activity; (ii) allocating each tenant in the plurality of tenants for migration activity, to a maintenance-window of one or more maintenance-windows; (iii) prioritizing the allocated plurality of tenants to yield an ordered list of tenants, in each maintenance-window of the one or more maintenance-windows; (iv) operating a migration activity during each maintenance-window, of the one or more maintenance-windows, according to the yielded ordered list of tenants; and (v) sending a notification with details of each migration activity to a corresponding tenant administrator, to be displayed, via a display unit.

21 Claims, 13 Drawing Sheets

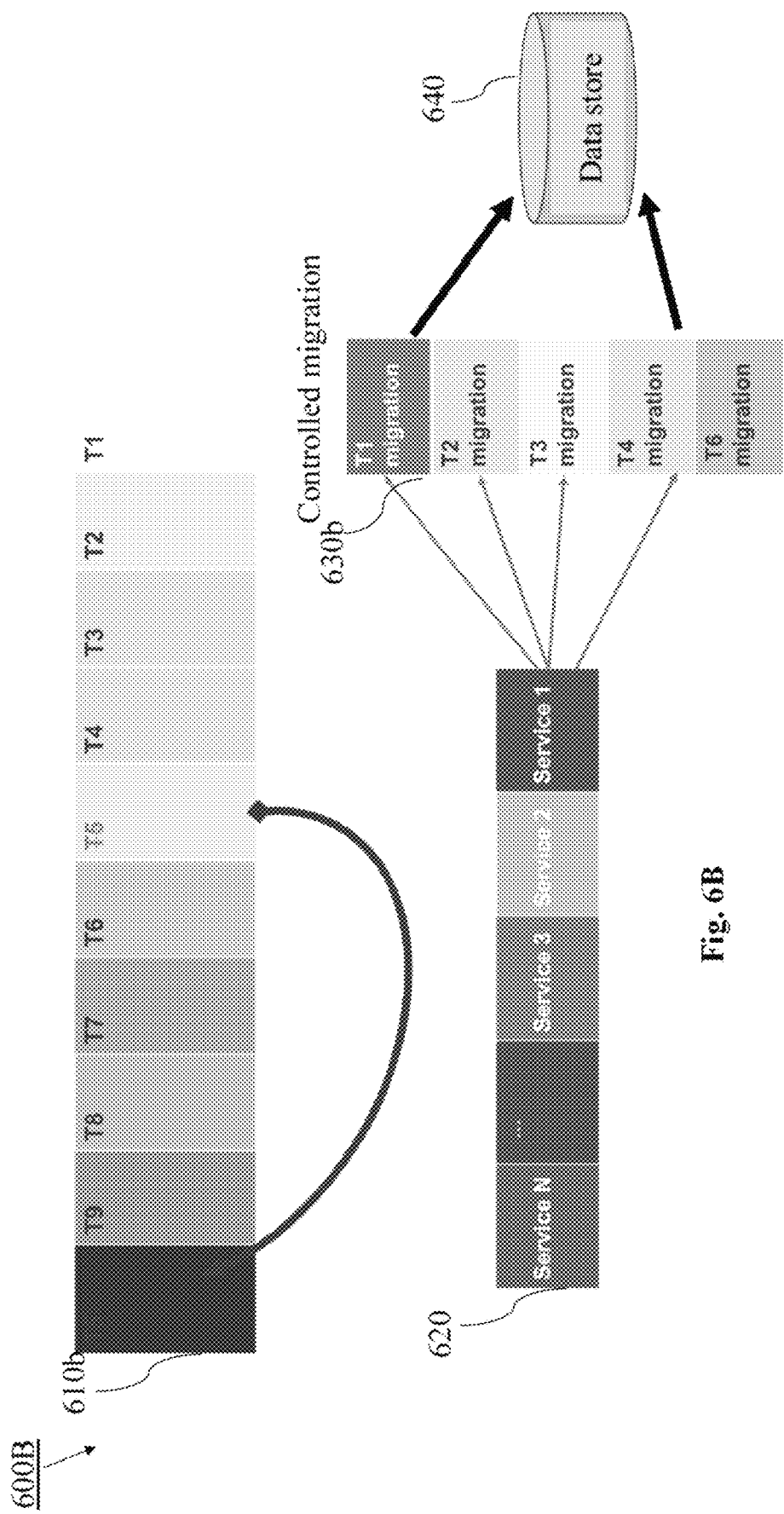

| Migration Id | MigrationStartTime | MigrationEndTime | Actual Migration StartTime | Actual Migration EndTime | Status |
|---|---|---|---|---|---|
| 8f3a0e79-8ff0-47e1-8c1d-7c5742f92c48 | 2021-05-24T22:00:00 | 2021-05-25T02:00:00 | | | SCHEDULED |

| Migration Id | | | | | Status |
|---|---|---|---|---|---|
| 8f3a0e79-8ff0-47e1-8c1d-7c5742f92c48 | S1 | 1 | | MW1 | SCHEDULED |
| 8f3a0e79-8ff0-47e1-8c1d-7c5742f92c48 | S1 | 1 | | MW2 | SCHEDULED |
| 8f3a0e79-8ff0-47e1-8c1d-7c5742f92c48 | S2 | 2 | | MW1 | SCHEDULED |
| 8f3a0e79-8ff0-47e1-8c1d-7c5742f92c48 | S2 | 2 | | MW2 | SCHEDULED |

| Tenant Id | TenantName | Status | Account Impact Score | Tenant Size | Tenant Working Start Time | Tenant Working End Time | Tenant Preferred Migration Window |
|---|---|---|---|---|---|---|---|
| 1eb4e6b-00bc-26d0-b919-0242ac110003 | Nice | ACTIVE | 10 | 1000 | 08:00:00 | 20:00:00 | MW1 |
| 1e74693-f895-e780-9675-0242ac110002 | ABC | ACTIVE | 50 | 100 | NULL | NULL | MW3 |

| Migration Id | Service Id | Tenant Id | Maintenance Window | Migration Script Version | Actual Migration StartTime | Actual Migration EndTime | Status | Retry Count | Notification Sent |
|---|---|---|---|---|---|---|---|---|---|
| 8f3a0e79-8ff0-47e1-8c1d-7c5742f92c48 | S1 | 11e74693-f895-e780-9675-0242ac110002 | MW1 | 100 | 2021-05-24T22:05:0 0 | | IN_PROGRESS | 0 | True |
| 8f3a0e79-8ff0-47e1-8c1d-7c5742f92c48 | S2 | 11e74693-f895-e780-9675-0242ac110002 | MW1 | | | | SCHEDULED | | |

| MigrationId | ServiceId | TenantId | MaintenanceWindow | ActualMigrationStartTime | ActualMigrationEndTime | Status | RetryCount | NotificationSent | ErrorMessage |
|---|---|---|---|---|---|---|---|---|---|
| 8f3a0e79-8ff0-47e1-8c1d-7c5742f92c48 | S1 | 11e74693-f895-e780-9675-0242ac110002 | MW2 | 2021-05-24T22:05:00 | 8021-05-25T05:05:00 | FAILED | 3 | True | Migration failed for tenantXpoint, dac10s55dad79 for reason Failed API: Iforce while UPDATE a Role for Application, ACD for role: Administrator] |
| 8f3a0e79-8ff0-47e1-8c1d-7c5742f92c48 | S2 | 11e74693-f895-e780-9675-0242ac110002 | MW1 | 2021-05-24T22:05:00 | 8021-05-25T05:05:00 | SUCCESS | 0 | True | |

| Migration ID | MigrationStart Time | Migration EndTime | ActualMigration startTime | ActualMigration endTime | Status |
|---|---|---|---|---|---|
| 7c974782 | 2021-05-24T22:00:00 | 2021-05-25T02:00:00 | 2021-05-24T22:05:00 | 2021-05-25T05:00 | COMPLETED |

| Migration ID | Service | Current Sequence | Maintenance Window | ActualMigration startTime | ActualMigration endTime | Status | Comments |
|---|---|---|---|---|---|---|---|
| | S1 | 1 | MW1 | 2021-05-24T22:00:00 | 2021-05-25T01:00:00 | COMPLETED | "Completed with Errors" |
| | S1 | 1 | MW2 | | | ABORTED | "15% Tenants failed to migrate in MW1" |
| | S2 | 2 | MW1 | 2021-05-24T22:00:00 | 2021-05-25T01:00:00 | COMPLETED | |
| | S2 | 2 | MW2 | 2021-05-25T02:00:00 | 2021-05-25T03:00:00 | COMPLETED | |

770

SYSTEM AND METHOD TO CONDUCT STAGGERED MAINTENANCE ACTIVITY BASED ON CUSTOMER PRIORITIZATION IN A CLOUD BASED SAAS PLATFORM CONTACT CENTER

TECHNICAL FIELD

The present disclosure relates to the field of migration activity in a cloud-based computing environment. More specifically, the present disclosure relates to the field of management of incremental changes and version updates to tenant schemas, in multi-tenant environment, which is operating a Software-as-a-Service (SaaS) platform-based contact center.

BACKGROUND

A cloud-based SaaS solution that is serving 24/7 contact centers, cannot have fixed time maintenance windows, as that could cause disruption of services for one or more tenants, i.e., contact centers. Especially for large tenants, where agent count is larger than 1,000.

Existing migration processes have several deficiencies. First, a 24/7 contact center availability is of prime importance. Some tenants, i.e., contact centers, who operate 24/7, could be active during a fixed time maintenance window, thereby affecting their operations.

Second, in common maintenance windows, multiple services may start a migration process, thereby overwhelming data sources. If a migration activity overwhelms data sources, such as a Relational Data Storage (RDS) service, e.g., Amazon RDS, the contact center availability may be at risk.

Third, currently the migration process does not prioritize the migration based on tenant type, tenant size and tenant activity levels. Fourth, in current solutions, the migrations do not prioritize according to services and its dependencies. For example, platform service migration cannot be initially executed followed by application service migrations. Lastly, there is no mechanism for autoscaling a migration process to make optimum usage of database resources.

Current migration solutions use manual assessment and staggering of tenant migration. However, the assessment is agnostic to agents' activity in the contact center, i.e., activity in tenants' site, tenant size and services dependencies.

Accordingly, there is a need for a technical solution to conduct a staggered maintenance activity, e.g., migration activity, in multiple maintenance windows, based on business activities and tenants account score, and to prioritize the tenants in each maintenance window.

Furthermore, there is a need for a technical solution that will provide zero downtime during migration activities, refrain from overwhelming the data store and allow web traffic served efficiently even during maintenance window while constantly monitoring tenant migration error rate for real-time decision making if to proceed migration activity or to stash.

SUMMARY

There is thus provided, in accordance with some embodiments of the present disclosure, a computerized-method to conduct a staggered maintenance activity based on tenants' prioritization for tenants of a cloud-based Software as a Service (SaaS) platform contact-center.

Furthermore, in accordance with some embodiments of the present disclosure, in a cloud-computing environment that is operating a SaaS-platform-contact-center for one or more tenants, said cloud-computing environment comprising a processor, a data store of one or more tenants, said processor may be operating a Staggered-Maintenance-Activity (SMA) module.

Furthermore, in accordance with some embodiments of the present disclosure, the SMA module may include: (i) selecting a plurality of tenants from the data store of one or more tenants, for a migration activity; (ii) allocating each tenant in the plurality of tenants for migration activity, to a maintenance window of one or more maintenance windows; (iii) prioritizing the allocated plurality of tenants to yield an ordered list of tenants, in each maintenance window of the one or more maintenance windows; (iv) operating a migration activity during each maintenance window, of the one or more maintenance windows, according to the yielded ordered list of tenants; and (v) sending a notification with details of each migration activity to a corresponding tenant administrator, to be displayed, via a display unit.

Furthermore, in accordance with some embodiments of the present disclosure, the allocating of each tenant in the plurality of tenants, to a maintenance window out of one or more maintenance windows, may be based on tenant non-working hours or if a tenant is operating 24/7, then the allocating may be to a maintenance window that is during determined low peak hours.

Furthermore, in accordance with some embodiments of the present disclosure, the allocating may be performed by static algorithms, before starting the one or more maintenance windows and the prioritizing in each maintenance window may be performed by dynamic algorithms, during the one or more maintenance windows.

Furthermore, in accordance with some embodiments of the present disclosure, the determined low peak hours, may be for a preconfigured period of time, in a maintenance window, and the determined low peak hours, may be by a lowest of calculated weighted average of tenant activity percentage that has been measured in one or more preconfigured times. The one or more preconfigured time may be M1, M2, M3.

Furthermore, in accordance with some embodiments of the present disclosure, a tenant activity percentage in a preconfigured time may be calculated based on formula I:

$$\text{tenant activity percentage} = (\text{call queue activity percentage} \times W_1) + (\text{agents activity percentage} \times W_2) \quad (\text{I})$$

whereby:

$W_1$ and $W_2$ are preconfigured weights, call queue activity percentage is calculated by: (number of calls that had more than average wait-time/total number of calls)×100, agents activity percentage is calculated by: (total handling time of agents in past preconfigured time/total number of agents logged in past preconfigured time)×100.

Furthermore, in accordance with some embodiments of the present disclosure, the static algorithms may be operated based on: (i) calculated tenant account impact score; and (ii) tenant size.

Furthermore, in accordance with some embodiments of the present disclosure, each maintenance window of the one or more maintenance windows may be in a different time slot.

Furthermore, in accordance with some embodiments of the present disclosure, the calculated tenant account impact score may be based on one or more parameters.

Furthermore, in accordance with some embodiments of the present disclosure, the dynamic algorithms may be measuring tenant activity percentage for a preconfigured period of time.

Furthermore, in accordance with some embodiments of the present disclosure, the migration activity may be at least one of: service migration activity and data manipulation in the data store. The service and the Furthermore, in accordance with some embodiments of the present disclosure, the SMA module may be further monitoring each data store of the plurality of tenants, which stores data that may be used by a service that the migration activity is running for, or stored data for data manipulation, to measure one or more data store metrics.

Furthermore, in accordance with some embodiments of the present disclosure, the one or more data store metrics may be at least one of: Central Processing Unit (CPU) utilization, a total requests count per second, a total count of failed requests.

Furthermore, in accordance with some embodiments of the present disclosure, when the CPU utilization of the data store is above a preconfigured threshold, or the total requests count per second is above a preconfigured threshold or the total count of failed requests is above a preconfigured threshold, the SMA module may be pausing the migration activity for the corresponding tenant till the measured data store metrics are below the preconfigured thresholds for a preconfigured period of time and if data store metrics are above the preconfigured thresholds after the preconfigured period of time, the SMA module may be further rescheduling the migration activity for the corresponding tenant.

Furthermore, in accordance with some embodiments of the present disclosure, the migration activity may be operated by one or more migration scripts which may be maintained in a microservice repository and read through an Application Programming Interface (API).

Furthermore, in accordance with some embodiments of the present disclosure, when the migration activity may be a service migration activity, the SMA module may be further operating per service and each service may have been preconfigured according to service dependencies so that interdependent services have their data migrated in their expected order of precedence.

Furthermore, in accordance with some embodiments of the present disclosure, the SMA module may be further operating a dynamic rescheduling of tenant migration activity when one or more data store metrics are not within a threshold during tenant allocated maintenance window.

Furthermore, in accordance with some embodiments of the present disclosure, when one or more data store metrics are not within a threshold during tenant allocated maintenance window for a corresponding rescheduled tenant migration activity, the migration activity may be operated manually by an expert.

Furthermore, in accordance with some embodiments of the present disclosure, when the migration activity may be data manipulation in the data store, migration scripts may be used to update data in the data stores.

Furthermore, in accordance with some embodiments of the present disclosure, the displayed details of the migration activity for each tenant may include at least one of: migration start time, migration end time, actual migration start time, actual migration end time, an error message and a status of the migration activity.

Furthermore, in accordance with some embodiments of the present disclosure, the status of the migration activity may be at least one of: scheduled, rescheduled, in-progress, failed, aborted and completed Furthermore, in accordance with some embodiments of the present disclosure, when a preconfigured percentage of migration activity which is having the status failed, is above a preconfigured threshold during a maintenance window, the SMA module may halt the migration activity for all remaining tenants and the status of the migration activity for remaining tenants in the maintenance window may be aborted.

There is further provided, in accordance with some embodiments of the present disclosure, a computerized-system, in a cloud-computing environment to conduct a staggered maintenance activity based on tenants' prioritization for tenants of a cloud-based Software as a Service (SaaS) platform contact-center.

Furthermore, in accordance with some embodiments of the present disclosure, the computerized-system may include: a processor and a data store of one or more tenants. The processor may be operating a Staggered-Maintenance-Activity (SMA) module. The SMA module may be configured to: (i) select a plurality of tenants from the data store of one or more tenants, for a migration activity; (ii) allocate each tenant in the plurality of tenants for migration activity, to a maintenance window of one or more maintenance windows; (iii) prioritize the allocated plurality of tenants to yield an ordered list of tenants, in each maintenance window of the one or more maintenance windows; (iv) operate a migration activity during each maintenance window, of the one or more maintenance windows, according to the yielded ordered list of tenants; and (v) send a notification with details of each migration activity to a corresponding tenant administrator, to be displayed, via a display unit.

BRIEF DESCRIPTION OF THE DRAWINGS

FIG. 6B is a diagram illustrating tenant's deprioritization in a maintenance window and service migration execution with continuous monitoring of data store, in accordance with some embodiments of the present disclosure;

FIG. 7A illustrates an example of a migration status table, in accordance with some embodiments of the present disclosure;

FIG. 7B illustrates an example of a service migration status table, in accordance with some embodiments of the present disclosure;

FIG. 7C illustrates an example of a tenant table, in accordance with some embodiments of the present disclosure;

FIG. 7D illustrates an example of tenant migration status table with two services in the same maintenance window, in accordance with some embodiments of the present disclosure;

FIG. 7E illustrates an example of a migration status table with two services in different maintenance windows, in accordance with some embodiments of the present disclosure;

FIG. 7F illustrates an example of an updated of a migration status table, in accordance with some embodiments of the present disclosure;

FIG. 7G illustrates an example of service migration status table, in accordance with some embodiments of the present disclosure;

DETAILED DESCRIPTION

Figure 1:
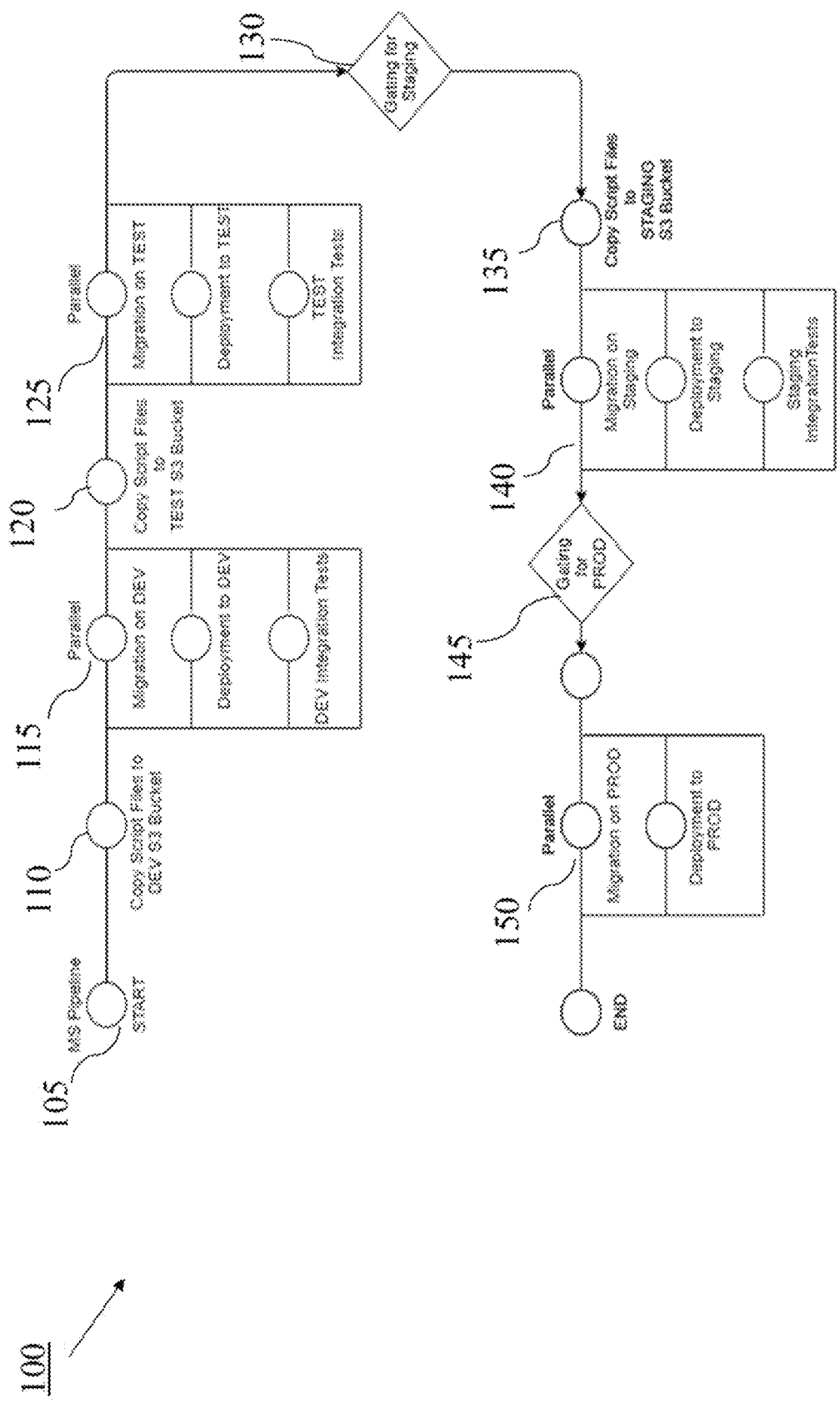
FIG. 1 schematically illustrates a high-level workflow of migration activity lifecycle in a cloud computing environment.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "customer" as used herein, refers to a tenant that is provided with a cloud-based Software as a Service (SaaS) platform contact center by a cloud-based SaaS platform contact center provider.

The term "maintenance window", as used herein, refers to a time slot during which a maintenance activity, e.g., migration activity is operated.

The term "Microservice (MS)", as used herein, refers to a small component that is independent from other components. For example, when the components of the present disclosure are operating in an AWS platform, the microservice may be a spring boot MS that is deployed on an Amazon Elastic Container Service (ECS) cluster. Spring boot is an open source Java-based framework used to create an MS. Amazon ECS is a regional service that simplifies running containers across multiple availability zones.

The term "DEV" as used herein, refers to a development environment.

The term "TEST" as used herein, refers to a test environment.

The term "PROD" as used herein, refers to a production environment.

The term "Lambda", as used herein, refers to Amazon serverless compute service.

The term "S3", as used herein, refers to a cloud storage service.

The term "schema" as used herein, refers to a directory in an operating system, where each directory i.e., schema has its own set of files, e.g., tables and objects.

The term "tenant schema", as used herein refers to tenants set of files.

The term "Relational Database Service (RDS)" as used herein, refers to a service to set up, operate and scale a rational database in a cloud computing environment. For example, Amazon RDS.

The term "Central Processing Unit (CPU) utilization", as used herein, refers to a monitoring metric that is provided by a data store provider, such as, Amazon RDS. The CPU utilization represents the availability of an RDS service to handle future requests.

FIG. 1 schematically illustrates a high-level workflow of migration activity lifecycle 100 in a cloud computing environment.

A cloud-based Software as a Service (SaaS) platform contact-center, is a bundle of contact center application services provided to tenants over the internet. From time to time a provider of a cloud-based Software as a Service (SaaS) platform contact-center upgrades the data store of services that is associated with each tenant which means that it has to be migrated. The migration activity is operated via migration scripts for the data store.

According to some embodiments of the present disclosure, a migration activity lifecycle 100, as shown in FIG. 1, is operating in Amazon Web Services (AWS) cloud environment. However, the usage of the migration activity lifecycle 100 of components of Amazon Web Services (AWS) cloud environment, is merely for purposes of simplicity of explanation and the migration activity lifecycle 100 may operate in any cloud environment having corresponding computing components.

An MS pipeline 105, i.e., Microservice pipeline, is a pipeline that each service is using when deployed to production environment. The pipeline is also responsible for copying migration script files 110 to a data store, such as DEV S3 bucket and triggering the migration service. In Production environment, the pipeline is triggered at the start of the maintenance window.

Then, a migration of the migration scripts, deployment to DEV and DEV integration tests may occur in parallel 115 in DEV environment. After the migrated and deployed script files have been successfully integrated, the script files are copied to TEST S3 bucket 120.

Next, a migration of the migration scripts, deployment to TEST and TEST integration tests may occur in parallel 125 in TEST environment. After the migrated and deployed script files have been successfully integrated in TEST environment the script files are gating for staging 130.

Next, the script files are copied to staging S3 bucket 135. In staging environment migration, deployment and integration of the script files may be operated in parallel 140. After the migrated and deployed script files have been successfully integrated the script files are gating for PROD 145. The script files may be migrated and deployed to production environment in parallel 150. The production environment is where the cloud-based SaaS platform contact-center is provided to one or more tenants, e.g., contact centers. The migration scripts may be maintained in a microservice repository which allows reading the migration scripts through Application Programming Interface (API), such as GitHub.

Staging is the point at which assets have been migrated to the cloud environment. However, they're not ready to be promoted to production environment yet.

A 24/7 contact center availability is of prime importance and it is a requirement for many tenants, i.e., customers of a cloud-based SaaS platform contact center provider. A provider of cloud-based SaaS platform contact center has dozens, hundreds or thousands of tenants and each migration activity is operated for the tenant schema, e.g., service migration activity and/or data manipulation in the data store. The data store may be a database which stores the data that is used by services. For example, RDS, DynamoDB etc. If a migration activity overwhelms the data store, the contact center availability to provide service to the contact center's customers, is at risk.

Each critical component of an application needs to be available to maintain uptime. Hence, even though the script files of the migration activity have been amended throughout the migration activity lifecycle 100, there may be unpredicted situations in production environment which may result in migration failure. Moreover, operating a migration activity to dozens, hundreds and even thousands of tenants, while maintaining all tenants' uptime, is another aspect that should be considered. Therefore, there is a need for a technical solution for migration that will be operated in a controlled manner and maintain uptime of each tenant to ensure that services will always be available to serve data traffic, in a cloud-based Software-as-a-Service (SaaS)-platform contact-center, for multi-tenants.

Existing migration process has following issues: (i) some tenants who operate 24/7 could be active during a maintenance window, thereby impacting their operations. (ii) in a common maintenance window, multiple services start migration process thereby overwhelming the data store such as Relational Data Storage (RDS) service like Amazon RDS. (iii) there is no prioritization of the migration based on tenant type, tenant size and tenant activity. (iv) there is no prioritization as per services. For example, platform service migration cannot be executed first followed by application service migrations; (v) there is no mechanism for autoscaling the migration process to make optimum use of data store resources; (vi) manual assessment and staggering of tenant migration as performed today is agnostic to agents activity.

Therefore, there is a need for a technical solution that will perform a migration to multi tenants in a staggered manner using multiple maintenance windows during off peak hours. The staggered maintenance activity should be based on multiple factors related to a contact center functions, such as tenant type, tenant size, tenant account impact score, tenant activity level and data store metrics, to provide a better control on the process of migration to mitigate the risk of tenant downtime.

According to some embodiments of the present discourse, for the simplicity of explanations the present disclosure is demonstrated in an Amazon Web Services (AWS) environment or infrastructure. However, a computerized-system, such as computerized system, such as computerized-system in a cloud-computing environment to conduct a staggered maintenance activity based on tenants' prioritization for tenants of a cloud-based Software as a SaaS platform contact-center 200 in FIG. 2 and a computerized-method to conduct a staggered maintenance activity based on tenants' prioritization for tenants of a cloud-based Software as a Service (SaaS) platform contact-center, such as a computerized-method that is operating a Staggered-Maintenance-Activity (SMA) module 300 in FIG. 3, may operate in any cloud computing environment having corresponding computing components.

In an AWS environment each of the microservices is installed inside a docker container named Amazon EC2 Instance. Amazon EC2 instance is a virtual server in Amazon's Elastic Compute Cloud (EC2) for running applications on an AWS infrastructure. Each Microservice is having at least two instances or can be configured to many instances to provide high availability of the present disclosure with different configurations of CPU, Memory, storage, and networking resources to suit users' needs.

For every MS instances there is an Elastic Load Balancer (ELB) attached to it. An ELB is a load-balancing service for AWS deployments. ELB automatically distributes incoming application traffic and scales resources to meet web traffic demands.

The purpose of automatic scaling is to automatically increase the size of the auto scaling group when demand goes up and decrease it when demand goes down. As capacity is increased or decreased, the Amazon EC2 instances being added or removed must be registered or deregistered with a load balancer. This enables an application to automatically distribute incoming web traffic across such a dynamically changing number of instances.

Each service stores data in a data store service, such as Relational Database Service (RDS). The RDS is configured in such a way that multiple services can simultaneously access it. The service logs data to AWS logs and has monitoring parameters configured in AWS CloudWatch metrics.

Figure 2:
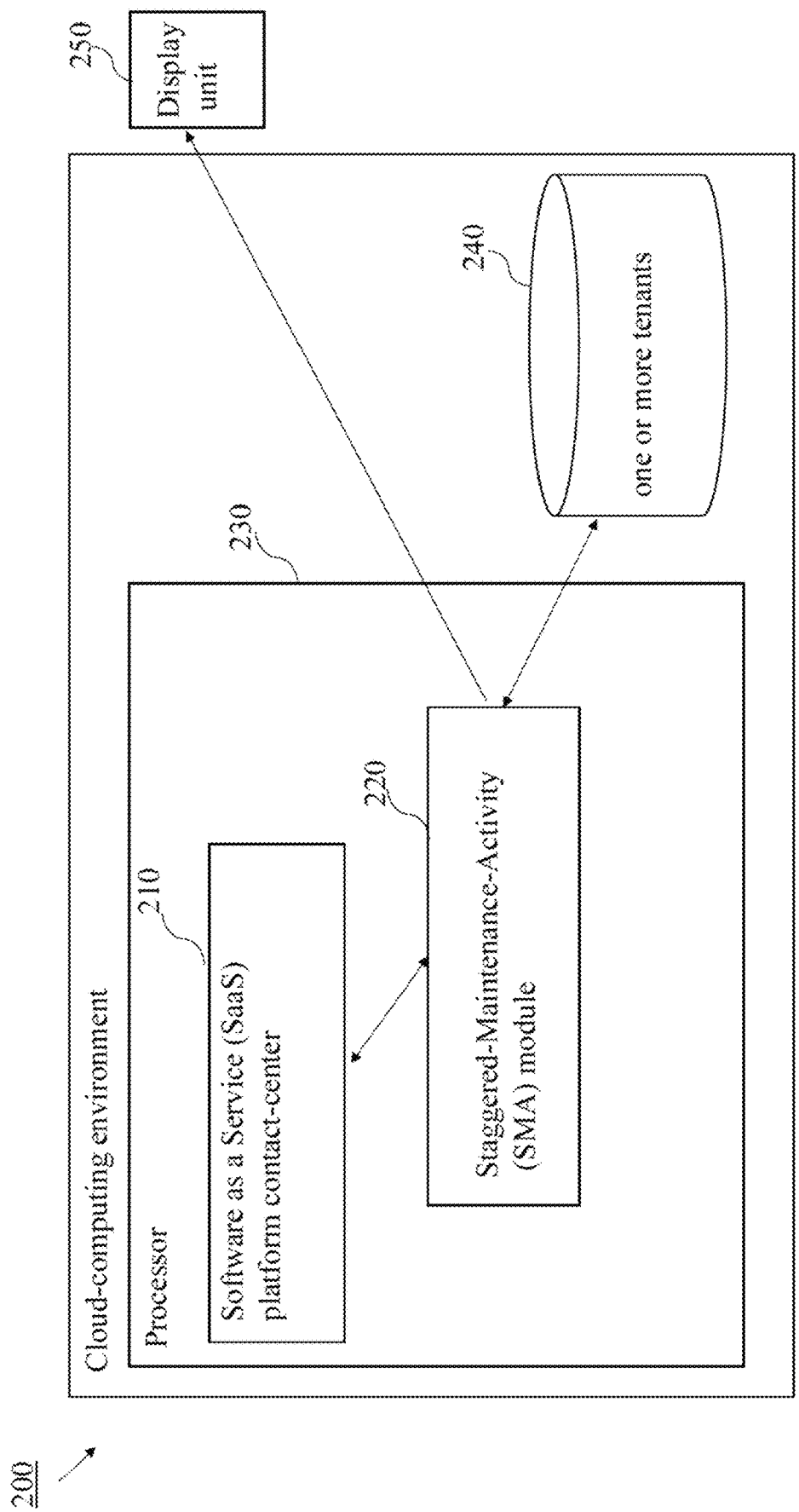
FIG. 2 schematically illustrates a high-level diagram of a system to conduct a staggered maintenance activity based on tenants' prioritization for tenants of a cloud-based Software as a Service (SaaS) platform contact-center, in accordance with some embodiments of the present disclosure.

FIG. 2 schematically illustrates a high-level diagram of a system to conduct a staggered maintenance activity based on tenants' prioritization for tenants of a cloud-based Software as a Service (SaaS) platform contact-center 200, in accordance with some embodiments of the present disclosure.

According to some embodiments of the present disclosure, a computerized system, such as computerized-system in a cloud-computing environment to conduct a staggered maintenance activity based on tenants' prioritization for tenants of a cloud-based Software as a SaaS platform contact-center 200, may include one or more processors 230 and a data store, such as data store of one or more tenants 240.

As to memory, a typical data store comes up with a preconfigured memory which is proportionate to the size of the datastore. For example, the AWS RDS provides details about maximum load it can handle. So, services are responsible to make optimum use of the resources and not cross the thresholds set for the data stores.

Figure 3:
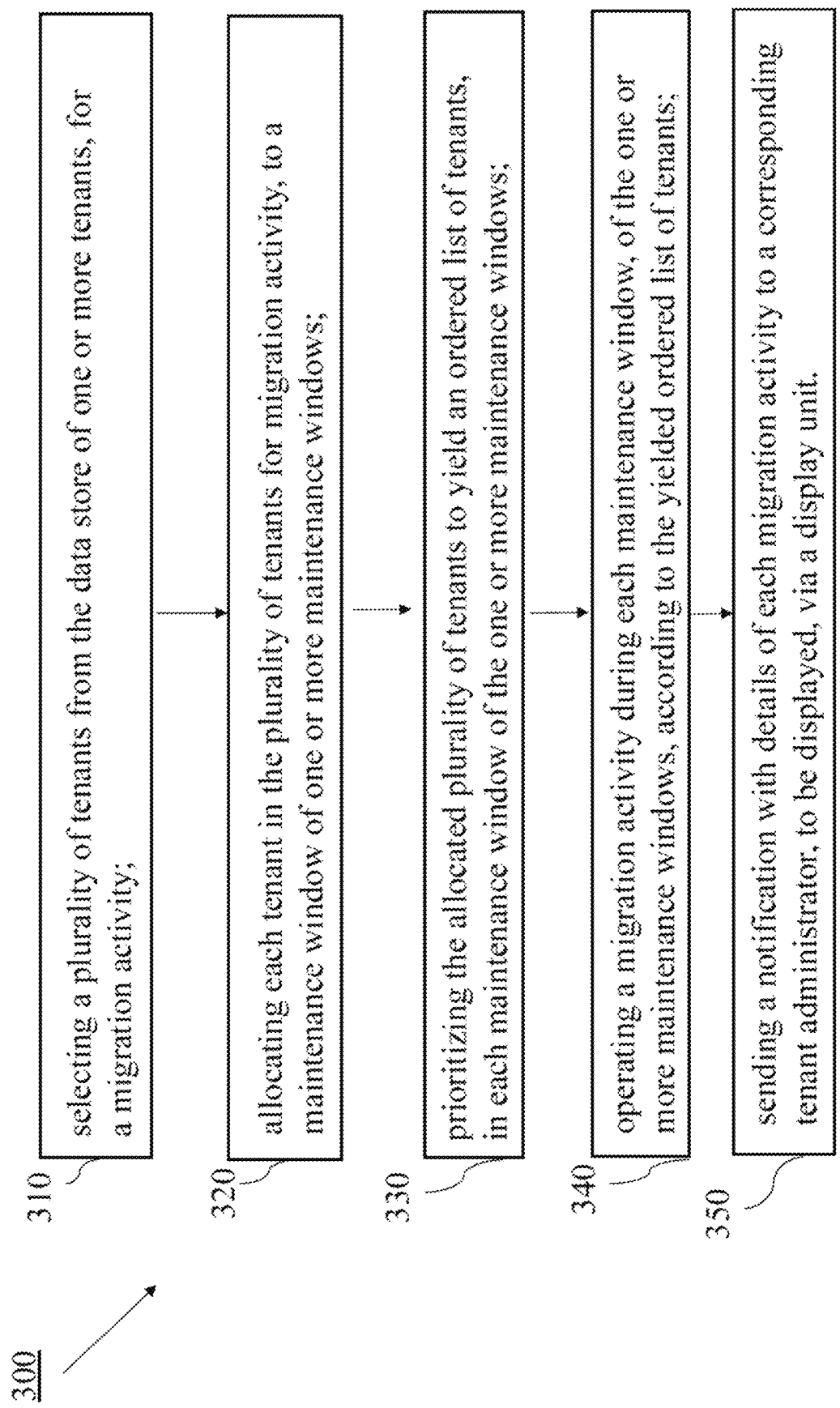
FIG. 3 is a high-level workflow of a Staggered-Maintenance-Activity (SMA) module, in accordance with some embodiments of the present disclosure.

According to some embodiments of the present disclosure, the processor 230 may operate a module, such as a Staggered-Maintenance-Activity (SMA) module 220 and such as SMA module 300 in FIG. 3, for a migration of tenant schema, in a SaaS platform contact-center 210. The SMA module 220 may ensure that the migration activity is operated in a controlled manner to maintain uptime of each tenant to ensure that services may be available to serve data traffic, in the cloud-based Software-as-a-Service (SaaS)-platform contact-center, for multi-tenants.

According to some embodiments of the present disclosure, the module, such as SMA module 220 and such as SMA module 300 in FIG. 3, may send a notification with details of each migration activity to a corresponding tenant administrator, to be displayed, via a display unit, such as display unit 250.

According to some embodiments of the present disclosure, results for migration execution for tenants in random order for a single service migration for 3,000 tenants, the RDS CPU utilization spiked up to 95% which might impact the ongoing agent activity as the database will not be available.

The results for migration execution with system to conduct a staggered maintenance activity based on tenants' prioritization for tenants of a cloud-based Software as a Service (SaaS) platform contact-center 200, where migration executed for 3,000 tenants in a controlled manner has been 51% max RDS CPU utilization.

FIG. 3 is a high-level workflow of a Staggered-Maintenance-Activity (SMA) module 300, in accordance with some embodiments of the present disclosure.

According to some embodiments of the present disclosure, operation 310 may comprise selecting a plurality of tenants from the data store of one or more tenants, for a migration activity. The data store of the one or more tenants may be a data store, such as data store of one or more tenants 240 in FIG. 2. The migration activity may be for tenant schema and may include service migration activity, data manipulation in the data store.

According to some embodiments of the present disclosure, operation 320 may comprise allocating each tenant in the plurality of tenants for migration activity, to a maintenance window of one or more maintenance windows.

According to some embodiments of the present disclosure, the allocating may be performed by static algorithms before starting the one or more maintenance windows. The static algorithms may be operated based on: (i) calculated tenant account impact score; and (ii) tenant size.

According to some embodiments of the present disclosure, the calculated tenant account impact score may be based on one or more parameters as detailed below.

According to some embodiments of the present disclosure, the maintenance window may be for example, assuming that in a contact center, i.e., tenant, there is eight hours of low traffic, it may be divided into three maintenance windows: maintenance 'window 1' (MW1): 11:00 pm 2:00 am; maintenance 'window 2' (MW2): 2:00 am-5:00 am; and maintenance 'window 3' (MW3): 5:00 am-7:00 am.

According to some embodiments of the present disclosure, the allocating of each tenant in the plurality of tenants, to a maintenance window out of one or more maintenance windows, may be based on tenant non-working hours or if a tenant is operating 24/7 then the allocating is to a maintenance window that is during determined low peak hours.

For example, all tenants whose working hours end before 11:00 pm may be scheduled in maintenance 'window 1' (MW1) for migration activity. For 24/7 tenants and tenants which are working during the eight hours of low traffic, the allocating may be during determined low peak hours. The determined of low peak hours may be for a preconfigured period of time, in a maintenance window, and the determined low peak hours may be by a lowest calculated tenant activity percentage.

For example, the determined low peak hours may be based on an analysis of the tenant activity levels for 60 days to determine the maintenance window for which the tenant has lowest activity levels. A maintenance window slot may be the lowest of average tenant activity percentage that has been measured in M1, M2 and M3 hours.

According to some embodiments of the present disclosure, the tenant activity percentage may be calculated based on formula I:

$$\text{tenant activity percentage} = (\text{call queue activity percentage} \times W_1) + (\text{agents activity percentage} \times W_2) \qquad (I)$$

whereby:

$W_1$ and $W_2$ are preconfigured weights, call queue activity percentage is calculated by: (number of calls that had more than average wait-time/total number of calls)×100, agents' activity percentage is calculated by: (total handling time of agents in past preconfigured time/total number of agents logged in past preconfigured time)× 100.

According to some embodiments of the present disclosure, operation 330 may comprise prioritizing the allocated plurality of tenants to yield an ordered list of tenants, in each maintenance window of the one or more maintenance windows.

According to some embodiments of the present disclosure, the prioritizing in each maintenance window may be performed by dynamic algorithms, during the one or more maintenance windows.

According to some embodiments of the present disclosure, operation 340 may comprise operating a migration activity during each maintenance window, of the one or more maintenance windows, according to the yielded ordered list of tenants.

According to some embodiments of the present disclosure, operation 350 may comprise sending a notification with details of each migration activity to a corresponding tenant administrator, to be displayed, via a display unit, as shown in FIGS. 7A-7G.

According to some embodiments of the present disclosure, the allocating may be performed by static algorithms before starting the one or more maintenance windows as shown in element 610*a* in FIG. 6, and the prioritizing in each maintenance window may be performed by dynamic algorithms, during the one or more maintenance windows. The static and dynamic algorithms may be collecting migration related information of each tenant, i.e., customer.

According to some embodiments of the present disclosure, the static algorithms may be operated based on: (i) calculated tenant account impact score, as detailed above; and (ii) tenant size. The dynamic algorithms may be measuring tenant activity percentage for a preconfigured period of time. The tenant activity percentage may be monitored using periodical analysis of agent activity and call queue size.

According to some embodiments of the present disclosure, tenant activity percentage may be calculated based on formula (I):

$$\text{tenant activity percentage} = (\text{call queue activity percentage} \times W_1) + (\text{agents activity percentage} \times W_2) \qquad (I)$$

whereby:

$W_1$ and $W_2$ are preconfigured weights, call queue activity percentage is calculated by: (number of calls that had more than average wait-time/total number of calls)×100, agents activity percentage is calculated by: (total handling time of agents in past preconfigured time/total number of agents logged in past preconfigured time)×100.

According to some embodiments of the present disclosure tenant type may be internal, customer and partner tenants. Tenant prioritization in the same maintenance window may be performed first by sorting them by account impact score and then if same account impact score then sorted by tenant size. The internal tenants may have zero or no account impact score hence they will automatically get prioritized first.

According to some embodiments of the present disclosure, the past preconfigured time may be for example the past hour.

According to some embodiments of the present disclosure, a module, such as Staggered-Maintenance-Activity (SMA) module 300, before accepting a request for migration, may further monitor each data store of the one or more tenants, which a migration activity is running for a service for the data store service, to measure one or more data store metrics. If the measured data store metrics are below a specific threshold only then migration request will be accepted, or else it may be deprioritized and may be added to the end of a migration activity execution queue. Meaning, only when the measured one or more data source metrics are below a preconfigured threshold, a migration activity may be started. Thus, providing zero downtime during migration activities and refraining from overwhelming the data store.

According to some embodiments of the present disclosure, the SMA module 300 may further operate a dynamic rescheduling of tenant migration activity, when one or more data store metrics are not within a threshold during tenant allocated maintenance window.

According to some embodiments of the present disclosure, when one or more data store metrics are not within a threshold during tenant allocated maintenance window for a corresponding rescheduled tenant migration activity, the migration activity may be operated manually by an expert.

According to some embodiments of the present disclosure, the one or more data store metrics are at least one of: Central Processing Unit (CPU) utilization, a total requests count per second, a total count of failed requests.

According to some embodiments of the present disclosure, when the CPU utilization may be above a preconfigured threshold, or the total requests count per second is above a preconfigured threshold the SMA module 300 may pause the migration activity for the corresponding tenant till the measured data store metrics are below the preconfigured thresholds for a preconfigured period of time and if data store metrics are above the preconfigured thresholds after the preconfigured period of time the SMA module 300 may further reschedule the migration activity for the corresponding tenant.

According to some embodiments of the present disclosure, the service migration activity may be isolated from the service start up or both may run in parallel, thereby avoiding any delay.

According to some embodiments of the present disclosure, in addition to the tenant prioritization by the SMA module, the migration activity may be operated also has the ability to prioritize as per service dependencies According to some embodiments of the present disclosure, the one or more maintenance windows may be, for example, three maintenance windows, which may be defined for a preconfigured time period, such as a period time of eight hours where network traffic is minimal. For example, from 11 pm to 7 am.

According to some embodiments of the present disclosure, the tenants, i.e., contact centers, in the multi-tenant environment, may be prioritized for scheme migration activity as per their least activity period, within the preconfigured maintenance window. Thus, it is ensured that each tenant activity is least impacted due to the service migration activity and that the migration activity may complete within the preconfigured maintenance window.

According to some embodiments of the present disclosure, the tenants may be migrated by prioritizing them as per their size, account impact score and low activity levels. Low activity levels may be monitored using periodical analysis of agent activity and contact queue size. A low impact tenant batch may run first so that if any issue occurs, migration for rest of the batches can be stopped rather than consuming the resources unnecessarily and further complicate the situation by impacting other tenants.

According to some embodiments of the present disclosure, before executing the migration for a tenant, tenant activity metrices may be checked. If the metrics are below a specific threshold only then migration execution may be initiated else, it will be added to the end of execution queue for retrial.

According to some embodiments of the present disclosure, a continuous monitoring of data store metrices may be operated to ensure that there are no disruptions due to unavailability of the database. If database metrices such as CPU utilization are not below a threshold value, the schema migrations may be halted till the desired levels are achieved, thus providing zero downtime to the tenants during the migration activities.

According to some embodiments of the present disclosure, the SMA module 300 may further use static and dynamic (runtime) prioritization for migration activities which leads to effective utilization of database and uninterrupted service to the end users.

According to some embodiments of the present disclosure, the data migration may be isolated, and service start up and both may run in parallel, thereby avoiding any delay.

According to some embodiments of the present disclosure, in addition to tenant prioritization the prioritization may be as per service dependencies. Each service may have been preconfigured according to service dependencies so that interdependent services can have their data migrated in their expected order of precedence.

Figure 4:
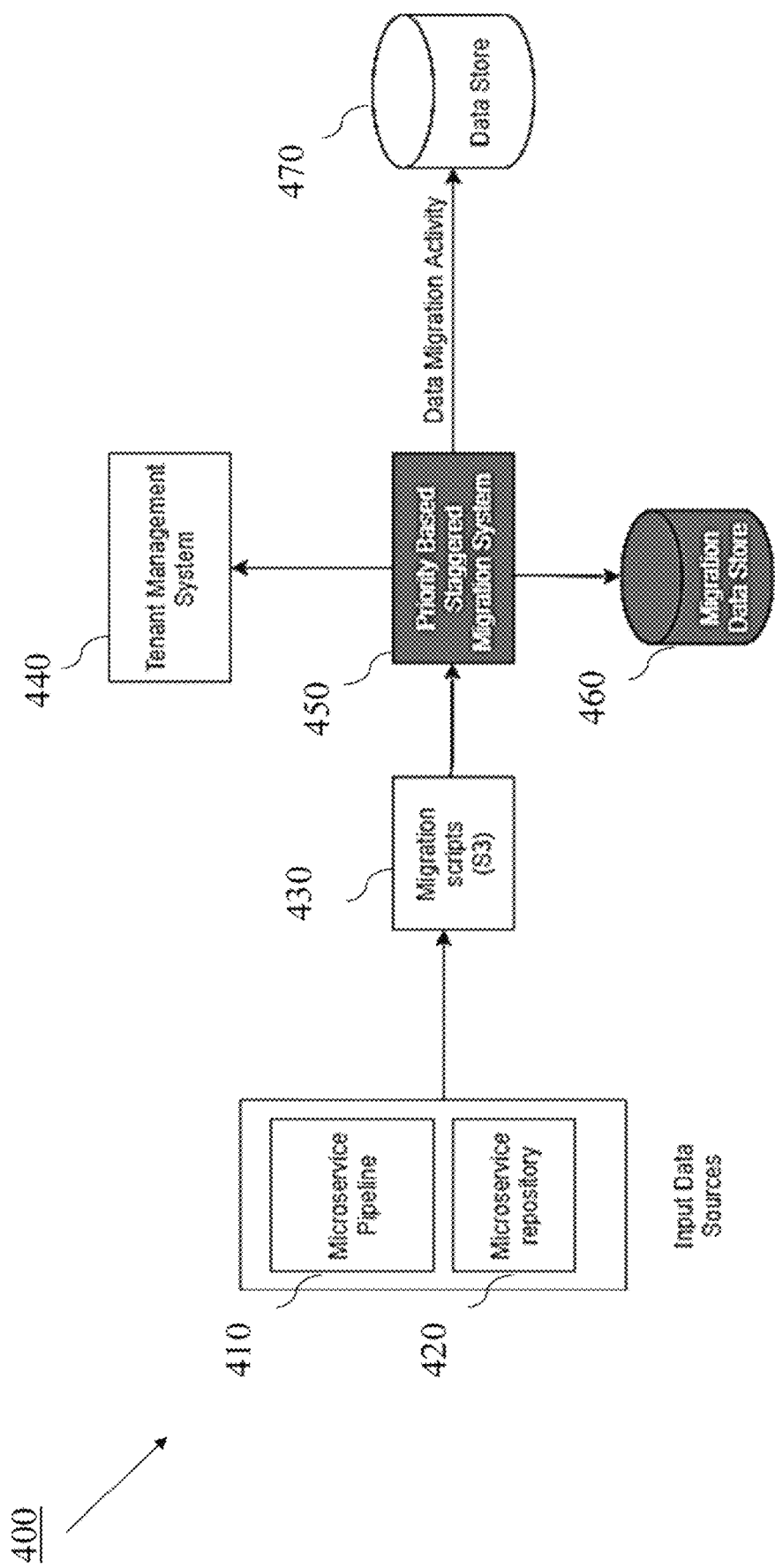
FIG. 4 is a high-level diagram of an example of a system to conduct a staggered maintenance activity based on tenants' prioritization for tenants of a cloud-based Software as a Service (SaaS) platform contact-center, in accordance with some embodiments of the present disclosure.

FIG. 4 is a high-level diagram of an example 400 of a system to conduct a staggered maintenance activity based on tenants' prioritization for tenants of a cloud-based Software as a Service (SaaS) platform contact-center, in accordance with some embodiments of the present disclosure.

According to some embodiments of the present disclosure, in every cloud computing environment, such as an Amazon Web Services (AWS) environment, a tenant management system 440 to provide a tenant management service. The provided tenant management service may maintain all the data related to tenant information. The data related to tenant information may be tenant name, tenant schema name, tenant status, account impact score, tenant working hours, tenant size, preferred maintenance window and tenant activity percentage.

According to some embodiments of the present disclosure, a tenant status may be active or inactive. An account impact score may be calculated based on one or more parameters. A high account impact score means the tenant is a highly valued tenant and any disruptions in uptime can cause major loss to the tenant.

According to some embodiments of the present disclosure, tenants having a low impact score may be prioritized for migration activity in an allocated maintenance window, so that if any issue occurs during the migration activity, the migration activity for the rest of the tenants may be stopped, rather than consuming resources unnecessarily and further complicating the situation by impacting other tenants operations.

According to some embodiments of the present disclosure, the one or more parameters may be for example, 'health score', 'handles critical services', 'partner', 'success package', 'market segment' and 'specific partner'.

According to some embodiments of the present disclosure, for example, the parameter health score may be predetermined considering various business aspects, such as tenant age, revenue it brings, business area and future revenue predicted from the tenant.

For example, the parameter health score may be an input from '0' to '100' where if the tenant has an input health score less than '40', the value of the health score may be translated to '1' point. If the tenant has an input health score from '40' to '49.99', the health score may be translated to '2' points. If the tenant has an input health score from '50' to '59.99', the health score may be translated to '3' points. If the tenant has an input health score from '60' to '69.99', the health score may be translated to '4' points. If the tenant has an input health score from '70' to '79.99', the health score may be translated to '5' points. If the tenant has an input health score from '80' to '89.99', the health score may be translated to '6' points. If the tenant has an input health score from '90' to '99.99', the health score may be translated to '7' points.

According to some embodiments of the present disclosure, the parameter 'handles critical services' may be scored based on if the tenant is handling critical services, like healthcare, translation services, accidental insurance etc.

According to some embodiments of the present disclosure, the parameter 'partner' may be 'yes' or 'no', where 'yes' may be scored '2' and 'no' may be scored '0'.

According to some embodiments of the present disclosure, the parameter 'success package' may be according to predefined package of the tenant. For example, if the tenant has a 'success package' of "ENTERPRISE PLUS", the success package may be translated to '8' points. If the tenant has a 'success package' of "ENTERPRISE", the success package may be translated to '6' points. If the tenant has a 'success package' of "PREMIER PLUS", the success package may be translated to '4' points. If the tenant has a 'success package' of "PREMIER", the success package may be translated to '2' points and otherwise the 'success package' may be translated to '0'.

According to some embodiments of the present disclosure, the parameter 'market segment' may be, for example, if the tenant has a 'market segment' of 'key', it may be translated to '3' points and if the tenant has a 'market segment' of 'premier'. it may be translated to '2' points and otherwise the 'market segment' may be translated to '0'.

According to some embodiments of the present disclosure, the parameter 'specific partner' may be, for example, partners who bring in more customers and are categorized differently as compared to normal partners.

According to some embodiments of the present disclosure, tenant working hours may be 24/7 or specific working hours during each day of the week.

According to some embodiments of the present disclosure, tenant size may be a number of users, e.g., agents, supervisors in the contact center.

According to some embodiments of the present disclosure, a preferred maintenance window is a time slot in which the activity level in the contact center is low or zero when the contact center is closed.

The migration scripts are the scripts that are used to update data in data stores. They may be SQL scripts or any other scripts that the data store supports to update the data. Each service maintains its own migration scripts. Service migration refers to the migration scripts belonging to that service, are executed. The migration scripts are commonly versioned by using version number in the migration script filename. The run time of the migration scripts should not take more than 30 sec to execute on a tenant schema. This ensures that migration activity completes within a migration window. Also, in one release only two migration scripts are allowed, and it may be increased based on data store capacity.

According to some embodiments of the present disclosure, migration scripts may be read from a microservice repository 420 through an Application Programming Interface (API), into a microservice pipeline, such as MS pipeline 410 and such as MS pipeline 105 in FIG. 1.

According to some embodiments of the present disclosure, the MS pipeline 410 may upload the migration scripts to a predefined location. The predefined location may be for example, an S3 bucket 430.

According to some embodiments of the present disclosure, a system, such as priority based staggered migration system 450, and such as the computerized system to conduct a staggered maintenance activity based on tenants' prioritization for tenants of a cloud-based Software as a Service (SaaS) platform contact-center 200 in FIG. 2, may operate a module, such as SMA module 300 in FIG. 3, by a processor, to select a plurality of tenants from a data store, such as the data store of one or more tenants 240 in FIG. 2, for a migration activity.

According to some embodiments of the present disclosure, migration data store 460 maintains the migration activity related tables whereas data store 470 stores the service related tables. The service migration scripts are executed on the data store 470.

Figure 5A:
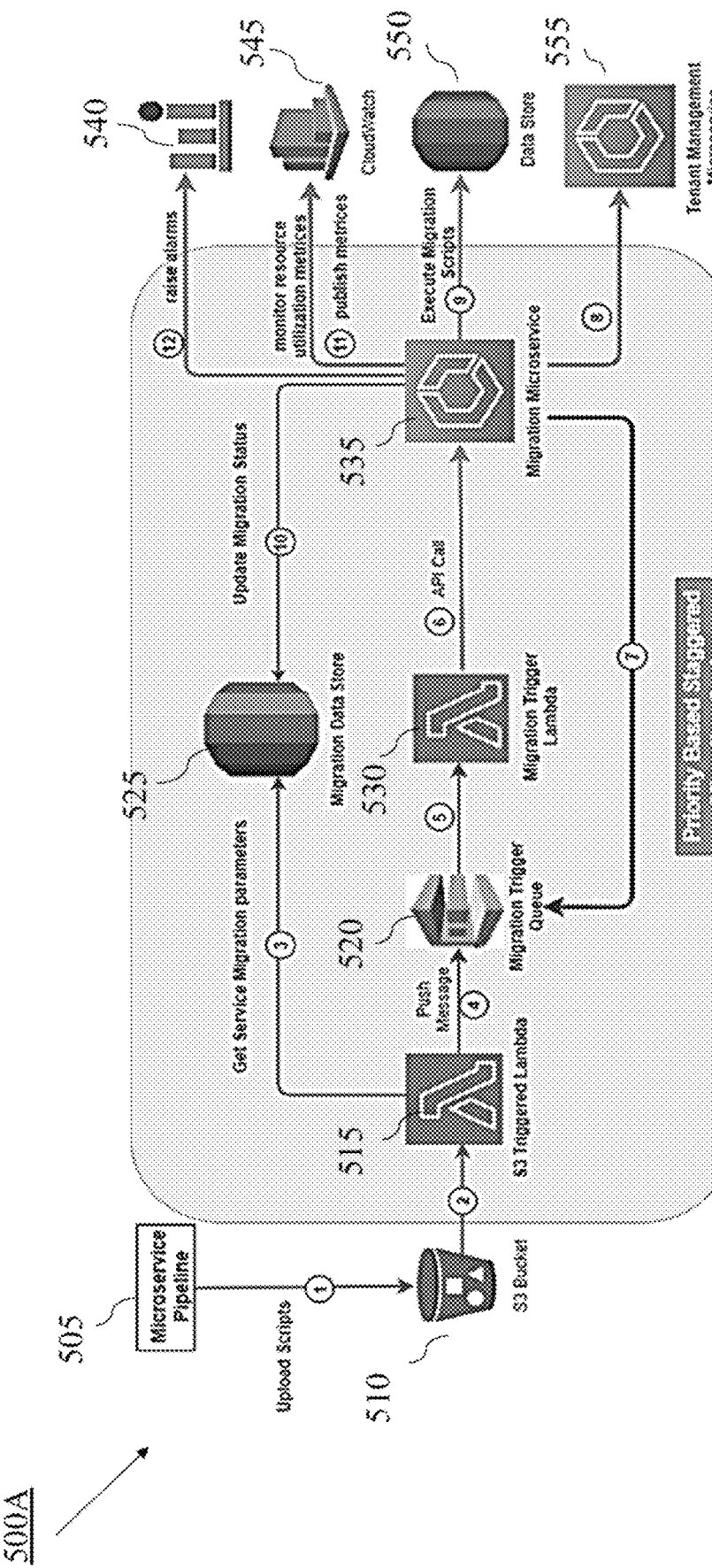
FIG. 5A is an example of a high-level architecture of an implementation of a system to conduct a staggered maintenance activity based on tenants' prioritization for tenants of a cloud-based SaaS platform contact-center 500A, in accordance with some embodiments of the present disclosure.

FIG. 5A is an example of a high-level architecture of an implementation of a system to conduct a staggered maintenance activity based on tenants' prioritization for tenants of a cloud-based SaaS platform contact-center 500, in accordance with some embodiments of the present disclosure.

According to some embodiments of the present disclosure, a system, such as computerized system, such as computerized-system in a cloud-computing environment to conduct a staggered maintenance activity based on tenants' prioritization for tenants of a cloud-based Software as a SaaS platform contact-center 200 that operates a module such as a Staggered-Maintenance-Activity (SMA) module 300 in FIG. 3, may be implemented in any cloud-based computing environment. For the simplicity of explanations example 500 is described in an Amazon Web Services (AWS) environment.

According to some embodiments of the present disclosure, migration scripts may be uploaded from a microservice pipeline, such as MS pipeline 505, and such as MS pipeline 410 in FIG. 4 to a data storage, such as S3 bucket 510.

According to some embodiments of the present disclosure, once all migration scripts are copied, the MA pipeline 505 may push a file in a common migration-notification folder in the same bucket with file name as the service name. This is done as a precaution operation to prevent from S3 event to be triggered for every migration script file to be copied to S3 bucket. Thus, an S3 event may be generated only once when a migration script file is added to flyway-notification folder once all migration scripts are copied to respective service folder. An event may be configured on S3 bucket migration-notification object which may notify an S3 triggered Lambda 515.

According to some embodiments of the present disclosure, the S3 Triggered lambda 515 may read the service name from the S3 event and may retrieve below parameters from a data store, such as migration data store 525, and such as migration data store 460 in FIG. 4. The parameters are: service Id, service priority, and latest migration version that exists for the service. The S3 Triggered lambda 515 may check the latest migration script version for that service. It may then read the S3 bucket script file names to derive the latest version and compare largest version number with one from the data store, such as migration data store 525, and such as migration data store 460 in FIG. 4. If migration data store version is a previous version, then it will push a message to migration trigger queue 520 with service name and migration script version to be deployed and service priority. If migration data store version is the same, then it indicates that the schemas are already up to date and the migration request may be ignored.

According to some embodiments of the present disclosure, message in the migration trigger queue 520 may trigger the migration trigger Lambda 530.

According to some embodiments of the present disclosure, on receiving the message if service priority is not defined in message then the migration trigger lambda 530 may call a migration microservice 535, such as SMA module 300 in FIG. 3, to start the migration execution. Incase service priority is defined the S3 triggered lambda 515 may check the migration data store if the services whose priority is higher than this have been completed successfully. If previous requests have failed to deploy, this request is also not executed. If previous requests have not been completed successfully an incremental delay may be added to the received Amazon Simple Queue Service (SQS) message and the message is again added to migration trigger queue 520 for retrial. If service migration status is already in progress for that maintenance window, then the migration request may be ignored.

According to some embodiments of the present disclosure, once the request has been validated to be executed, the migration trigger lambda 530 may call the migration microservice API to start the migration execution. The migration trigger lambda 530 may make a non-blocking call to the migration API, so that it does not have to wait till the migration activity completes. Incase this is the first service being migrated in maintenance window MW1, a notification service API is called which sends notifications to all the tenant administrators indicating the migration is being started. The notification may be displayed on a display unit, such as display unit 250 in FIG. 2.

According to some embodiments of the present disclosure, if the migration microservice Application Programming Interface (API) throttles or returns '5xx' exception the migration trigger lambda 530 may update the delay in received migration trigger queue message and add it to the migration trigger queue 520 for retrial of execution. If max retries have already been attempted, then alarms may be raised, and migration may be marked as failed. On each try the retrial count in incremented.

According to some embodiments of the present disclosure, once the migration microservice receives the migration execution request it may fetch the tenants list from tenant management service 555 using an API, e.g., GitHub.

According to some embodiments of the present disclosure, based on a dynamic algorithm, which were specified in the migration microservice, such as SMA module 300 in FIG. 3 the SMA module 300 in FIG. 3 may start executing the migration script on tenant schema in data store 550.

According to some embodiments of the present disclosure, once the migration activity completes successfully for all tenants, the following parameters in migration data store 525 may updated by the migration microservice as follows: latest migration version that has been deployed for the service and service migration execution status, as shown in FIGS. 7F-7G.

Figure 7H:
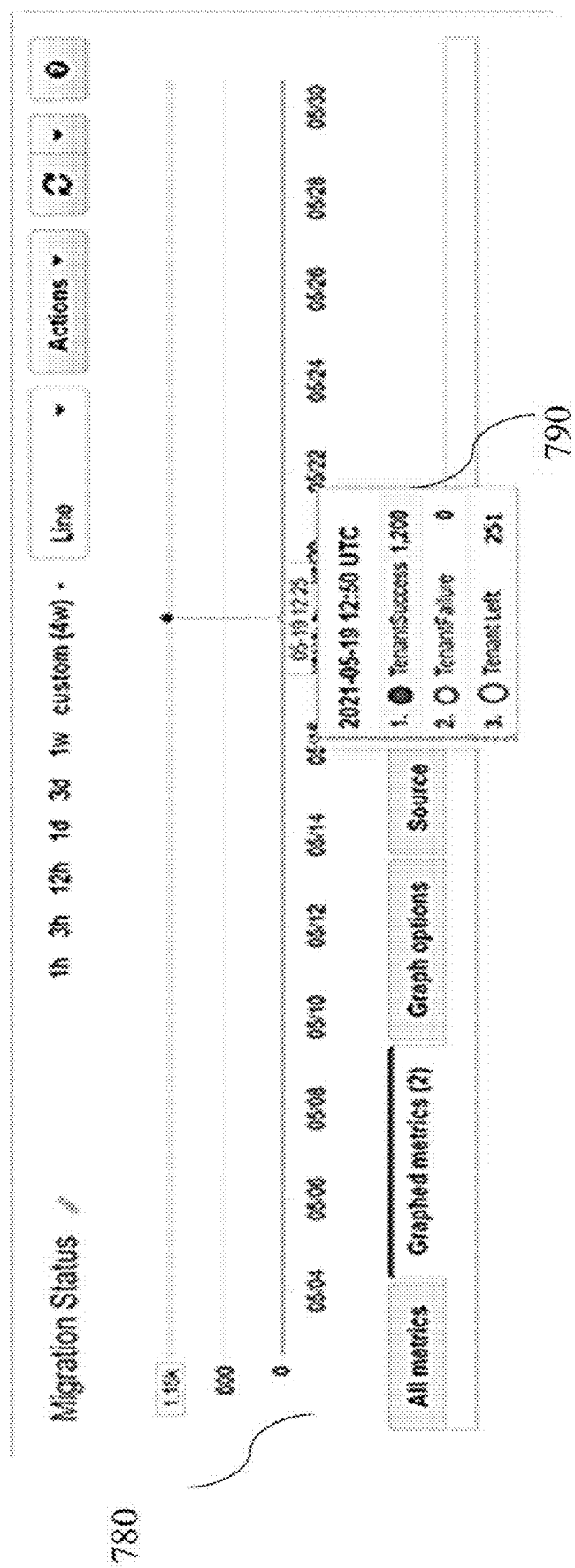
FIG. 7H illustrates the live status of migration activity for a service, in migration status table, in accordance with some embodiments of the present disclosure.

According to some embodiments of the present disclosure, the migration microservice 535 may also monitor resource, e.g. data store utilization metrics by a monitoring component, such as AWS CloudWatch 545 and may publish metrics based on which the dashboard may display migration status via a display unit, such as display unit 240 in FIG. 2. For example, element 780 in FIG. 7H shows migration status dashboard and element 790 shows the live status of migration activity for a service.

According to some embodiments of the present disclosure, in case of failure apart from updating the status, an alarm 540 may be generated, as shown in FIG. 7G, so that the development teams and migration owners may check the failure reasons and act accordingly.

Figure 5B:
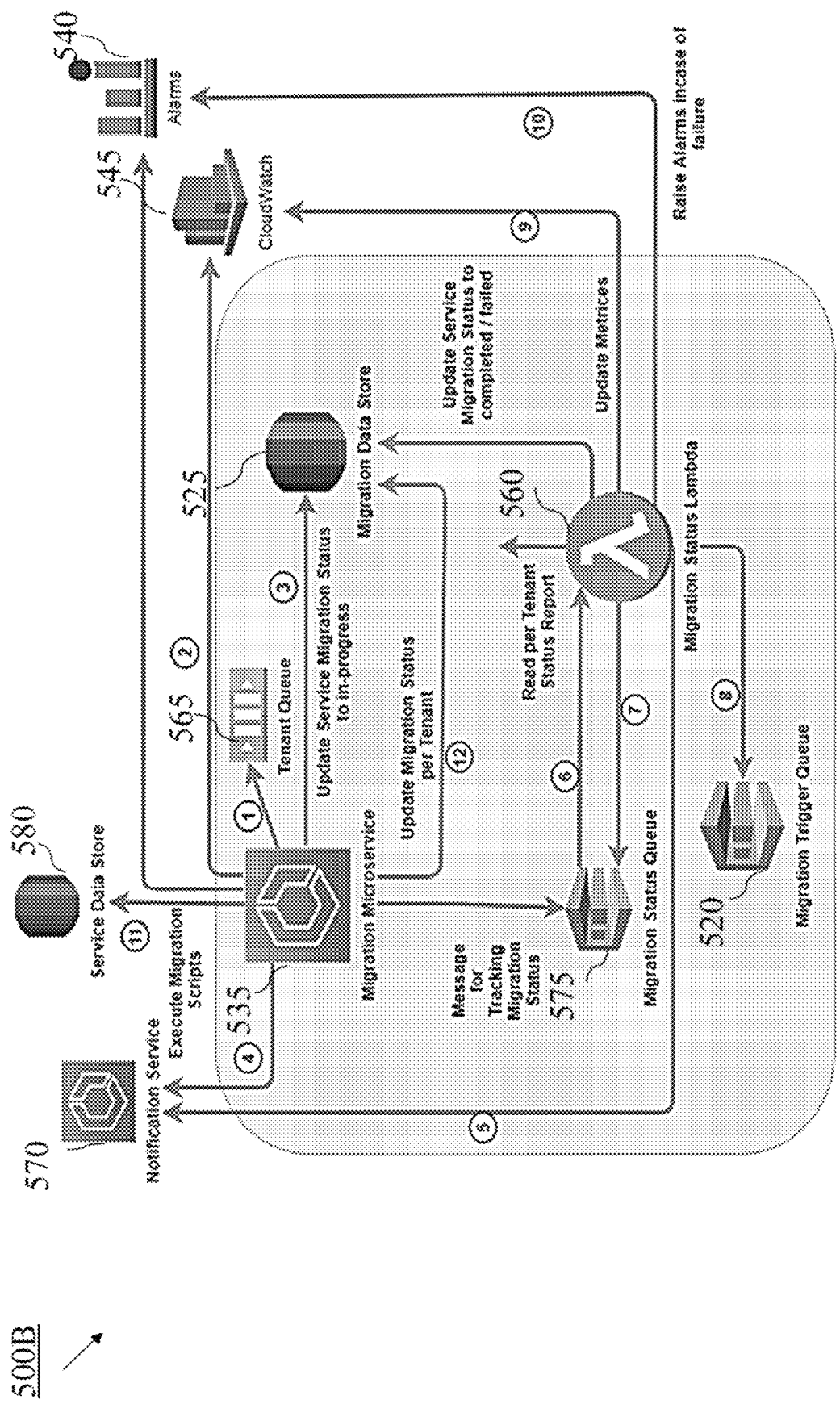
FIG. 5B is an example an implementation of an architecture of a Staggered-Maintenance-Activity (SMA) module 500B, in accordance with some embodiments of the present disclosure.

FIG. 5B is an example an implementation of an architecture of a Staggered-Maintenance-Activity (SMA) module 500B, in accordance with some embodiments of the present disclosure.

According to some embodiments of the present disclosure, an implementation of SMA module, such as SMA module 300 in FIG. 3, may be via a migration microservice, such as migration microservice 535 that is interacting with other components in the cloud-based environment when the migration service 535, may receive a request to execute a migration for a service during a maintenance window.

Figure 6A:
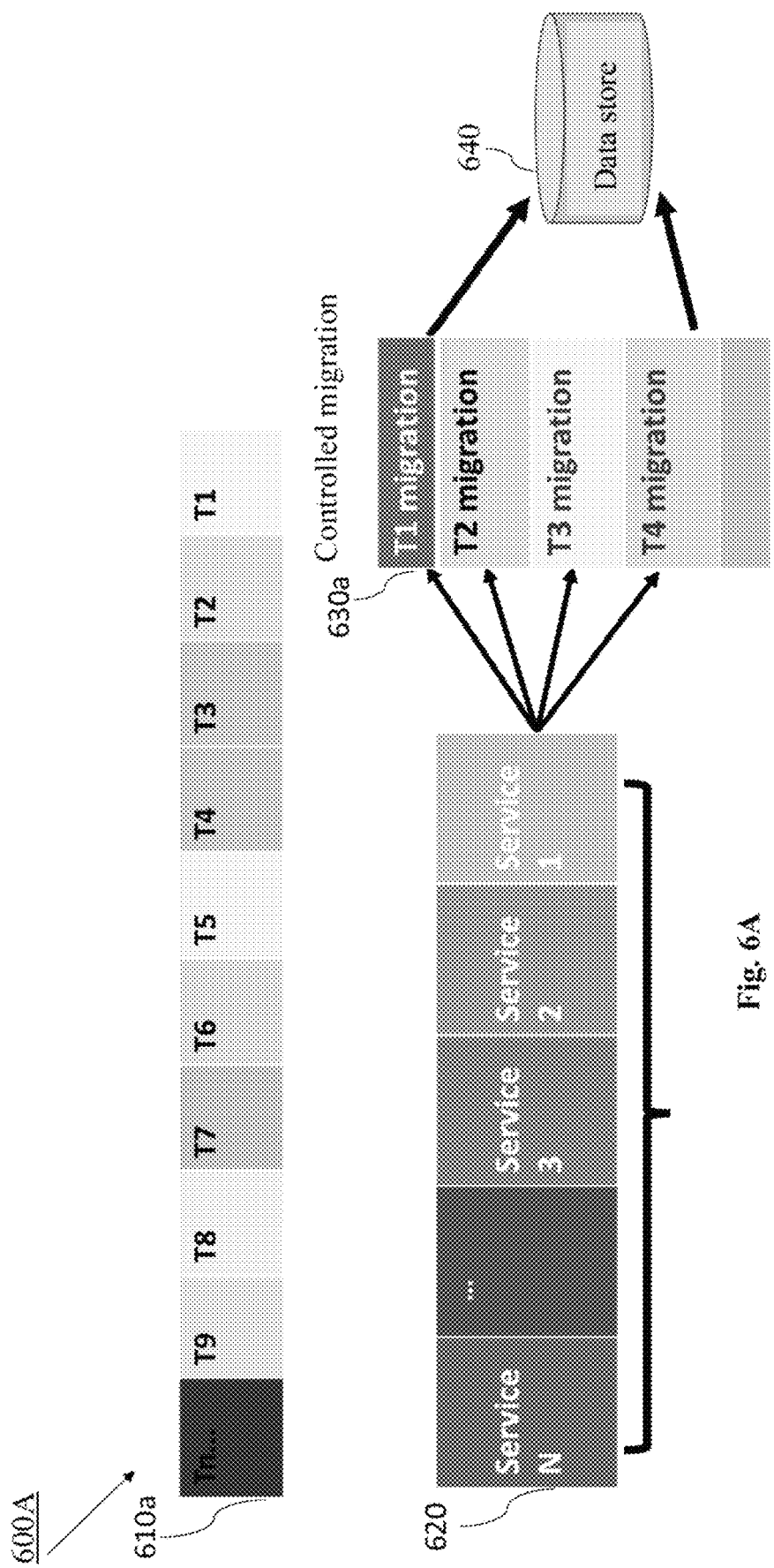
FIG. 6A is a diagram illustrating tenants' prioritization in a maintenance window and service migration execution with continuous monitoring of data store, in accordance with some embodiments of the present disclosure.

According to some embodiments of the present disclosure, the migration service 535 may fetch an ordered list of tenants for a maintenance window and add it to a queue, such as tenant queue 565 and tenant queue 610a in FIG. 6A. The tenant queue 565 may be implemented as an in-memory FIFO queue which may be maintained in the migration microservice.

According to some embodiments of the present disclosure, before starting the migration, the data store metrics may be checked by a monitoring component, such as AWS CloudWatch 545 to ensure that all parameters are within threshold. For example, if Central Processing Unit (CPU) utilization of the data store is above a predefined threshold for more than 10 minutes, the migration activity may be paused, as the data store cannot support the migration requests. Thus, refraining from overwhelming the data store and providing zero downtime to the tenants during the migration activities.

According to some embodiments of the present disclosure, the migration microservice 535 may mark the migration status 'in progress' to indicate the migration has started for respective maintenance window. A notification may be sent to be displayed via a display unit such as display unit 250 in FIG. 2, as shown in FIG. 7D.

According to some embodiments of the present disclosure, the migration microservice 535 may send a notification to a notification service 570 which notifies start of migration to each tenant administrator. This notification may be sent only if it's a first migration window (MW1).

According to some embodiments of the present disclosure, once the data store metrics are under a preconfigured threshold a migration tracker message may be added to migration status queue 575. This is added to keep track of the migration. The Message has a 15 minutes delay so that the message becomes visible after 15 minutes and tracking is done every 15 minutes. This time is configurable and may be configured based on number of tenants migrated in a maintenance window and time required for migration for a single tenant.

For example, for single migration script to be run on 100 tenants the time required would be 10 min. It is assumed a migration script takes 30 sec and the migration is running on 5 tenants in parallel:

(No. of tenants×Time required for migration execution)/(Number of parallel executions)

According to some embodiments of the present disclosure, based on the message visibility the status migration lambda 560 may be invoked every 15 minutes. The migration status lambda 560 may check the migration status for each tenant. If the migration has failed for more than a threshold count of tenants, the migration may be marked as failed, as shown in element 750 in FIG. 7E.

According to some embodiments of the present disclosure, the migration tracker message may be added to the migration status queue 575 till the end of maintenance period.

According to some embodiments of the present disclosure, when the second and third migration window time starts, the migration status lambda 560 may add start migration message to the migration trigger queue 520. This is done only if the failures are below a preconfigured threshold.

According to some embodiments of the present disclosure, the migration status lambda 560 may also update the metrics in the monitoring component, such as AWS CloudWatch 545 to inform the tenant migration status.

According to some embodiments of the present disclosure, if migration is not completed for all services and the last maintenance window does not end, then 15 minutes are added or time remaining for 'MW3' to end as the message delaySeconds. If migration status of each tenant is not updated by the migration microservice after end of 'MW3', then an alarm for migration failure for that service may be raised 540.

According to some embodiments of the present disclosure, in case of error or migration failures the alarms may be raised 540, as shown in element 770 in FIG. 7G.

According to some embodiments of the present disclosure, the migration microservice may execute the migration of the tenants as per the static and dynamic prioritization.

According to some embodiments of the present disclosure, the allocating of each tenant in the plurality of tenants, to a maintenance window out of one or more maintenance windows, is based on tenant non-working hours or if a tenant is operating 24/7 then the allocating is to a maintenance window that is during determined low peak hours.

According to some embodiments of the present disclosure, for example, maintenance window allocation may include the following maintenance windows of eight hours low web traffic:

'Maintenance window 1' (MW1): 11:00 pm-2:00 am
'Maintenance window 2' (MW2): 2:00 am-5:00 am
'Maintenance window 3' (MW3): 5:00 am-7:00 am.

Which means that all tenants whose working hours end before 11:00 pm will be scheduled in 'maintenance window 1' (MW1). For 24/7 tenants and tenants operating during the eight hours maintenance window, the tenant activity levels may be analyzed for 60 days to determine the maintenance window for which the tenant has the lowest activity levels.

According to some embodiments of the present disclosure, the tenant migration details may be updated by the migration microservice 535. If all tenant migration is completed the service level migration details for the given maintenance window may be updated.

On starting of maintenance windows 'MW2' and 'MW3', the migration microservice may add the tenants with migration status as RESCHEDULED and retry count<maxRetryCount to the end of tenant queue for retrial of migration execution.

FIG. 6A is a diagram illustrating tenants' prioritization in a maintenance window and service migration execution with continuous monitoring of data store, in accordance with some embodiments of the present disclosure.

According to some embodiments of the present disclosure, tenants T1 through Tn 610a, may be statically prioritized in a maintenance window. The static allocation may be operated based on: (i) calculated tenant account impact score; and (ii) tenant size.

According to some embodiments of the present disclosure, a controlled migration 630a of tenants T1 through T4 may not utilize the time slot for T5 in the controlled migration 630a of services 'service 1' through 'service N', as shown in element 620, because a monitoring component, such as AWS CloudWatch 545 in FIGS. 5A-5B may detect that the database server's CPU utilization is above a preconfigured threshold.

According to some embodiments of the present disclosure, SMA module 300 in FIG. 3, which may be operated by a migration microservice, such as migration microservice 535 in FIGS. 5A-5B, may pause till the CPU utilization is below the preconfigured threshold and then may resume the migration. If the CPU utilization remains above the preconfigured threshold for a specified amount of time, the migration may be stopped and the SMA module 300 in FIG. 3 may further reschedule the migration activity for the corresponding tenant, e.g. T5 as shown in FIG. 6B.

FIG. 6B is a diagram illustrating tenant's deprioritization in a maintenance window and service migration execution with continuous monitoring of data store, in accordance with some embodiments of the present disclosure.

According to some embodiments of the present disclosure, tenant T5 has been dynamically deprioritized in the maintenance window 610b due to monitored data store metrics which were above a preconfigured threshold. Thus, providing zero downtime during migration activities, and refraining from overwhelming the data store.

According to some embodiments of the present disclosure, T6 has been scheduled in the controlled migration 630b and T5 has been moved to the end of the queue, i.e. deprioritized as shown in element 610*b*.

According to some embodiments of the present disclosure, migration status tables shown in FIGS. 7A-7G may be sent as notifications to be displayed, via a display unit, such as display unit 250 in FIG. 2 for tenants' administrator.

FIG. 7A illustrates an example of a migration status table 710, in accordance with some embodiments of the present disclosure.

According to some embodiments of the present disclosure, a migration status table may maintain a complete status from first maintenance window to last maintenance window. For example, migration status table 710 may include: migration Id, migration start time, migration end time, actual migration start time, actual migration end time and the status of the migration Id.

FIG. 7B illustrates an example of a service migration status table 720, in accordance with some embodiments of the present disclosure.

According to some embodiments of the present disclosure, a service migration status table 720 may be a table that maintains the migration execution status for a service during a maintenance window.

According to some embodiments of the present disclosure, the table may include migration Id which may be comprised of services: S1 and S2, service execution order, maintenance windows, the actual migration start time, actual migration end time and status of each service in each maintenance window.

FIG. 7C illustrates an example of a tenant table 730, in accordance with some embodiments of the present disclosure.

According to some embodiments of the present disclosure, the tenant table may include tenant information, such as tenant Id, tenant name, tenant status, account impact score tenant working hours, preferred maintenance window.

According to some embodiments of the present disclosure, for example, maintenance window allocation may include the following maintenance windows of eight hours low web traffic:
'Maintenance window P' (MW1): 11:00 pm-2:00 am
'Maintenance window 2' (MW2): 2:00 am-5:00 am
'Maintenance window 3' (MW3): 5:00 am-7:00 am.

According to some embodiments of the present disclosure, tenant table, may be for example, tenant table 730 which is an example showing how tenant data for 24/7 tenant may be maintained. In tenant table 730, a tenant Id '11eb4e6b-00bc-26d0-b919-0242ac 110003' of tenant name 'Nice', tenant status 'ACTIVE', account impact score '10' tenant size '1000', tenant working hours: tenant working start time: 08:00:00, tenant working end time 20:00:00 and tenant preferred migration window 'MW1'. The tenant has been allocated to maintenance window MW1 because the tenant working end time is before 11 pm. The account impact score is low therefore the tenant may probably prioritized to be first among other tenants having a higher account impact score.

A tenant Id '11e74693-f895-e780-9675-0242ac110002' of tenant name 'ABC', tenant status 'ACTIVE', account impact score '50' tenant size '100', tenant working hours: tenant working start time 'NULL', tenant working end time 'NULL' and tenant preferred migration window 'MW3'.

FIG. 7D illustrates an example of tenant migration status table 740 with two services in the same maintenance window, in accordance with some embodiments of the present disclosure.

According to some embodiments of the present disclosure, tenant migration status table, such as tenant migration status table 740 may include a migration Id '8f3a0e79-8ffD-47e1-8c1d-7c5742f92c48' which includes two services: S1 and S2 for the same tenant having a tenant Id '11e74693-f895-e780-9675-0242ac110002' during maintenance window 'MW1', migration script version 100 for S1, actual migration start time: 22:05:00 on May 24, 2021, status 'IN-PROGRESS' which means that the migration service S1 didn't end yet, retry count '0' which means that it didn't fail and a notification which may be sent by a migration microservice, such as migration microservice 535 in FIGS. 5A-5B to a notification service 570 in FIG. 5B, which notifies start of migration to each tenant administrator. This notification has been sent because it's a first migration window (MW1).

According to some embodiments of the present disclosure, tenant migration status table, such as tenant migration status table 740 may also include details of service S2 which has been scheduled.

FIG. 7E illustrates an example of a migration status table 750 with two services in different maintenance windows, in accordance with some embodiments of the present disclosure.

According to some embodiments of the present disclosure, a migration status table, such as migration status table 750 may include details of migration services S1 and S2 of migration Id '8f3a0e79-8ff0-47e1-8c1d-7c5742f92c48' for the same tenant Id '11e74693-f895-e780-9675-0242ac110002'. Service S1 has started migration at 22:05:00 on May 24, 2021 in maintenance window MW2 and ended migration at 05:05:00 on May 25, 2021. The migration has been retried three times and failed. The reason for failure may be specified as an error message in real time: "Migration failed for tenant: perm_dac1065844979 for reason: Failed API: [Error while UPDATE a Role for Application: ACD for role: Administrator]"

Service S2 has started migration in MW1 at 22:05:00 on May 24, 2021 and successfully ended at 02:05:00 on May 25, 2021. Service start and end time is the actual time which the service takes to migrate all tenants. It may be less than the Maintenance window time or 5 or 10 minutes more that MW time as it in updated in a scheduled manner.

FIG. 7F illustrates an example of an updated of a migration status table 760, in accordance with some embodiments of the present disclosure.

According to some embodiments of the present disclosure, migration status table 760 shows that migration Id '8f3a0e79-8ff0-47e1-8c1d-7c5742f92c48' has been completed. The migration start time was 22:00:00 at May 24, 2021 but the actual migration start time was 22:05:00 and the migration end time was at 02:00:00 on May 25, 2021, but the actual migration end time was 05:50:00 on May 25, 2021.

FIG. 7G illustrates an example of service migration status table 770, in accordance with some embodiments of the present disclosure.

According to some embodiments of the present disclosure, service migration status table 770 shows that migration Id '8f3a0e79-8ffD-47e1-8c1d-7c5742f92c48' has completed migration of service S1 in maintenance window 'MW1'. The error message indicates that it has been completed with errors.

According to some embodiments of the present disclosure, every migration activity performed for a tenant in a maintenance window may be tracked in a tenant migration status table. When a preconfigured percentage of migration activity which is having the status failed, e.g., 15% tenants failed to migrate in maintenance window MW1, is above a preconfigured threshold during a maintenance window, the SMA module, such as SMA module 300 in FIG. 3, halts the migration activity for all remaining tenants and the status of the migration activity for remaining tenants in the maintenance window is aborted. [LL—It doesn't make sense from the table—please explain] Thus, allowing web traffic served efficiently even during maintenance window while constantly monitoring tenant migration error rate for real-time decision making if to proceed migration activity or to stash.

According to some embodiments of the present disclosure, SMA module runs migrations for other services, for example, authentication, authorization, user-management etc. and it maintains reports of execution per service.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method to conduct a staggered maintenance activity based on tenants' prioritization for tenants of a cloud-based Software as a Service (SaaS) platform contact-center, the computerized-method comprising:
   in a cloud-computing environment that is operating a SaaS-platform-contact-center for one or more tenants, said cloud-computing environment comprising a processor, a data store of one or more tenants, said processor is operating a Staggered-Maintenance-Activity (SMA) module, said SMA module comprising:
   selecting a plurality of tenants from the data store of one or more tenants, for a migration activity;
   allocating each tenant in the plurality of tenants for migration activity, to a maintenance window of one or more maintenance windows;
   prioritizing the allocated plurality of tenants to yield an ordered list of tenants, in each maintenance window of the one or more maintenance windows;
   operating a migration activity during each maintenance window, of the one or more maintenance windows, according to the yielded ordered list of tenants; and
   sending a notification with details of each migration activity to a corresponding tenant administrator, to be displayed, via a display unit,
   wherein the allocating is performed by static algorithms before starting the one or more maintenance windows and the prioritizing in each maintenance window is performed by dynamic algorithms, during the one or more maintenance windows.

2. The computerized method of claim 1, wherein the allocating of each tenant in the plurality of tenants, to a maintenance window out of one or more maintenance windows, is based on tenant non-working hours or if a tenant is operating 24/7 then the allocating is to a maintenance window that is during determined low peak hours.

3. The computerized method of claim 2, wherein the determined of low peak hours is for a preconfigured period of time, in a maintenance window, and wherein the determined low peak hours is by a lowest of calculated weighted average of tenant activity percentage that has been measured in one or more preconfigured times.

4. The computerized method of claim 3, wherein a tenant activity percentage in a preconfignred time is calculated based on formula I:

$$\text{tenant activity percentage} = (\text{call queue activity percentage} \times W_1) + (\text{agents activity percentage} \times W_2) \quad \text{(I)}$$

whereby:
$W_1$ and $W_2$ are preconfigured weights,
call queue activity percentage is calculated by: (number of calls that had more than average wait–time/total number of calls)×100,
agents activity percentage is calculated by: (total handling time of agents in past preconfigured time/total number of agents logged in past preconfigured time)×100.

5. The computerized method of claim 1, wherein the static algorithms are operated based on: (i) calculated tenant account impact score; and (ii) tenant size.

6. The computerized method of claim 1, wherein each maintenance window of the one or more maintenance windows is in a different time slot.

7. The computerized method of claim 5, wherein the calculated tenant account impact score is based on one or more parameters.

8. The computerized method of claim 1, wherein the dynamic algorithms are measuring tenant activity percentage for a preconfigured period of time.

9. The computerized method of claim 1, wherein the migration activity is at least one of: service migration activity and data manipulation in the data store.

10. The computerized method of claim 9, wherein the SMA module is further monitoring, each data store of the plurality of tenants, which stores data that is used by a service that the migration activity is, running for, or stored data for data manipulation, to measure one or more data store metrics.

11. The computerized method of claim 10, wherein the one or more data store metrics are at least one of Central Processing Unit (CPU) utilization, a total requests count per second, a total count of failed requests.

12. The computerized method of claim 11, wherein when the CPU utilization of the data store is above a preconfigured threshold, or the total requests count per second is above a preconfigured threshold or the total count of failed requests is above a preconfigured threshold, the SMA module is pausing the mi ration activity for the corresponding tenant till the measured data store metrics are below the preconfigured thresholds for a preconfigured period of time and if data store metrics are above the preconfigured thresholds after the preconfigured period of time the SMA module is further rescheduling the migration activity for the corresponding tenant.

13. The computerized method of claim 9, wherein when the migration activity is a service migration activity, the SMA module is further operating per service and wherein each service has been preconfigured according to service dependencies so that interdependent services have their data migrated in their expected order of precedence.

14. The computerized method of claim 9, wherein when the migration activity is data manipulation in the data store, migration scripts are used to update data in the data stores.

15. The computerized method of claim 1, wherein the status of the migration activity is at least one of: scheduled, rescheduled, in-progress, failed, aborted and completed.

16. The computerized method of claim 15, wherein when a preconfigured percentage of migration activity which is having the status failed, is above a preconfigured threshold during a maintenance window, the SMA module halts the migration activity for all remaining tenants and the status of the migration activity for remaining tenants in the maintenance window is aborted.

17. A computerized-system in a cloud-computing environment to conduct a staggered maintenance activity based on tenants' prioritization for tenants of a cloud-based Software as a Service (SaaS) platform contact-center, the computerized-system comprising:
   a processor,
   a data store of one or more tenants,
   said processor is operating a StaggeredMaintenance-Activity (SMA) module, said SMA module is configured to:
   select a plurality of tenants from the data store of one or more tenants, for a migration activity;
   allocate each tenant in the plurality of tenants for migration activity, to a maintenance window of one or more maintenance windows;
   prioritize the allocated plurality of tenants to yield an ordered list of tenants, in each maintenance window of the one or more maintenance windows;
   operate a migration activity during each maintenance window, of the one or more maintenance windows, according to the yielded ordered list of tenants; and
   send a notification with details of each migration activity to a corresponding tenant administrator, to be displayed, via a display unit,
   wherein the allocating is performed by static algorithms before starting the one or more maintenance windows and the prioritizing in each maintenance window is performed by dynamic algorithms, during the one or more maintenance windows.

18. A computerized-method conduct a staggered maintenance activity based on tenants' prioritization for tenants of a cloud-based Software as a Service (SaaS) platform contact-center, the computerized-method comprising:
   in a cloud-computing environment that is Operating a SaaS-platform-contact-center for one or more tenants, said cloud-computing environment comprising a processor, a data store of one or more tenants, said processor is operating a Staggered-Maintenance-Activity (SMA) module, said SMA module comprising:
   selecting a plurality of tenants from the data store of one or more tenants, for a migration activity;
   allocating each tenant in the plurality of tenants for migration activity, to a maintenance window of one or more maintenance windows;
   prioritizing the allocated plurality of tenants to yield an ordered list of tenants, in each maintenance window of the one or more maintenance windows;
   operating a migration activity during each maintenance window, of the one or more maintenance windows, according to the yielded ordered list of tenants; and
   sending a notification with details of each migration activity to a corresponding tenant administrator, to be displayed, via a display unit,
   wherein the migration activity is operated by one or more migration scripts which are maintained in a microservice repository and read through an Application Programming Interface (API).

19. A computerized-method to conduct a staggered maintenance activity based on tenants' prioritization for tenants of a cloud-based Software as a Service (SaaS) platform contact-center, the computerized-method comprising:
   in a cloud-computing environment that is operating a SaaS-platform-contact-center for one or more tenants, said cloud-computing environment comprising a processor, a data store of one or more tenants, said processor is operating a Staggered-Maintenance-Activity (SMA) module, said SMA module comprising:
   selecting a plurality of tenants from the data store of one or more tenants, for a migration activity;
   allocating each tenant in the plurality of tenants for migration activity, to a maintenance window of one or more maintenance windows;
   prioritizing the allocated plurality of tenants to yield an ordered list of tenants, in each maintenance window of the one or more maintenance windows;
   operating a migration activity during each maintenance window, of the one or more maintenance windows, according to the yielded ordered list of tenants; and
   sending a notification with details of each migration activity to a corresponding tenant administrator, to be displayed, via a display unit,
   wherein the SMA module is further operating a dynamic rescheduling of tenant migration activity when one or more data store metrics are not within a threshold during tenant allocated maintenance window.

20. A computerized-method to conduct a staggered maintenance activity based on tenants' prioritization for tenants of a cloud-based Software as a Service (SaaS) platform contact-center, the computerized-method comprising:
   in a cloud-computing environment that is operating a SaaS-platform-contact-center for one or more tenants, said cloud-computing environment comprising a processor, a data store of one or more tenants, said processor is operating a Staggered-Maintenance-Activity (SMA) module, said SMA module comprising:
   selecting a plurality of tenants from the data store of one or more tenants, for a migration activity;
   allocating each tenant in the plurality of tenants for migration activity, to a maintenance window of one or more maintenance windows;

prioritizing the allocated plurality of tenants to yield an ordered list of tenants, in each maintenance window of the one or more maintenance windows;

operating a migration activity during each maintenance window of the one or more maintenance windows, according to the yielded ordered list of tenants; and sending a notification with details of each migration activity to a corresponding tenant administrator, to be displayed, via a display unit, wherein the displayed details of the migration activity for each tenant includes at least one of: migration start time, migration end time, actual migration start time, actual migration end time, an error message and a status of the migation activity.

21. The computerized method of claim 19, wherein when one or more data store metrics are not within a threshold during tenant allocated maintenance window for a corresponding rescheduled tenant migration activity, the migration activity is operated manually by an expert.

* * * * *